June 12, 1962 J. J. DONOVAN 3,039,090
RADAR ANTI-JAMMING DEVICE
Filed Aug. 26, 1959
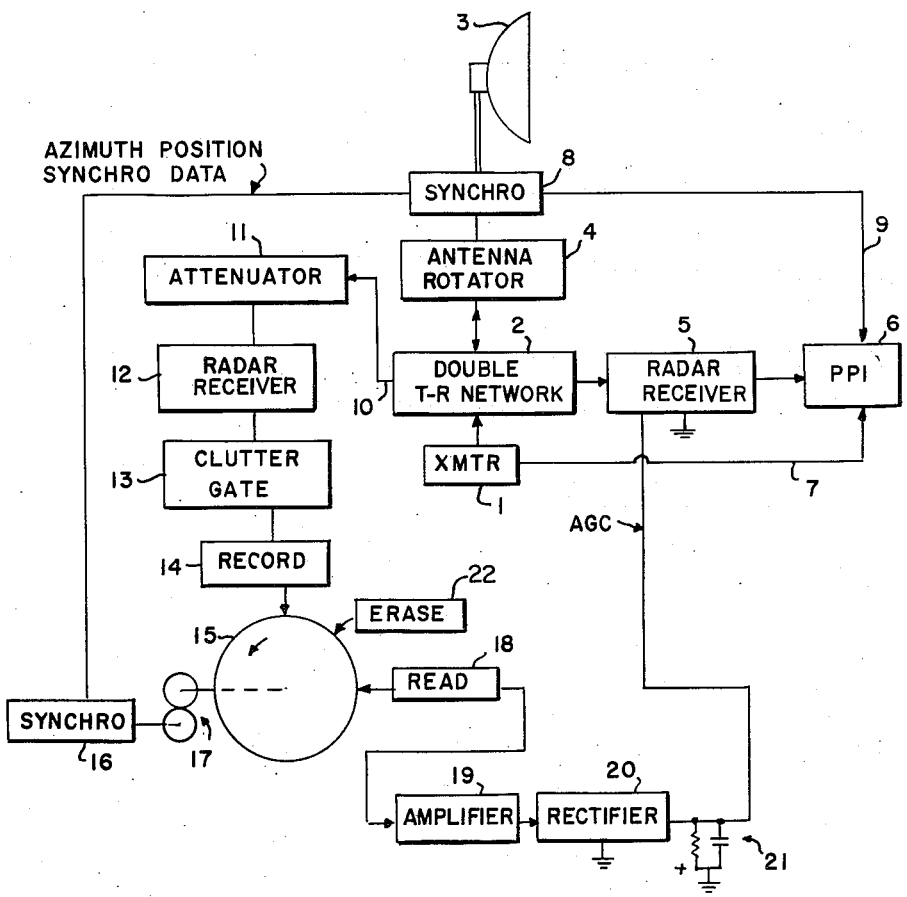
INVENTOR.
JOHN J. DONOVAN
BY
ATTORNEY
AGENT

United States Patent Office 3,039,090
Patented June 12, 1962

3,039,090
RADAR ANTI-JAMMING DEVICE
John J. Donovan, Arlington, Va., assignor to the United States of America as represented by the Secretary of the United States Air Force
Filed Aug. 26, 1959, Ser. No. 836,308
2 Claims. (Cl. 343—5)
(Granted under Title 35, U.S. Code (1952), sec. 266)

The invention described herein may be manufactured and used by or for the United States Government for governmental purposes without payment to me of any royalty thereon.

The purpose of this invention is to provide means for minimizing the effects of jamming signals received by a radar system from various azimuths and at various levels of intensity. Briefly, this is accomplished by recording the jamming signal during each scanning revolution of the radar antenna and using the recorded signal during the next revolution to effect a proportionate reduction in the gain of the radar receiver. In this manner it is possible to automatically compensate for changing levels and azimuth directions of the jamming signal.

The invention will be described in more detail with reference to the accompanying drawing which illustrates a specific embodiment of the invention.

Referring to the drawing, transmitter 1 applies periodic pulses of high frequency energy through transmit-receive network 2 to directional antenna 3, which is rotated at constant speed by antenna rotator 4. Reflections of high frequency energy from objects illuminated by the antenna beam are received by the antenna and applied through T-R network 2 to receiver 5, the video output of which is applied to and displayed on plan position indicator 6. The sweep of the PPI 6 is synchronized with the radiated pulses by means of synchronizing pulses applied from the transmitter to the PPI over connection 7 and the direction of the sweep is made to correspond to that of the antenna by the azimuth data supplied by synchro 8 over appropriate electrical connections represented by the line 9. The foregoing is all in accordance with standard radar practice.

The T-R network 2 is provided with a second output 10 whereby the received signal is also applied through attenuator 11 to a second radar receiver 12. This receiver should have a wide dynamic amplitude range, for example 90 db, because of the wide range of jamming signals likely to be encountered. The attenuator 11 is provided as further protection against saturation of the receiver by strong jamming signals. The video output of receiver 12 is applied through clutter gate 13 to recording head 14 of magnetic drum 15. Prior to recording, the drum is cleared of any previous recording by the action of erase head 22. The purpose of the clutter gate is to insure that only jamming data and not target data is recorded on the drum. This is a standard device which operates to block the passage of any signal having a duration less than a predetermined minimum, for example, 50 microseconds. Examples of discriminators for rejecting pulses having less than a predetermnied duration may be found in vol. 3 of the Radiation Laboratory Series, entitled: Radar Beacons, Roberts, McGraw-Hill Book Company, FIG. 9.1, page 181, and FIG. 9.4, page 185.

The drum 15 is driven in synchronism with antenna 3 by means of a synchro motor 16 which is supplied with azimuth position information by synchro transmitter 8. The ratio of gears 17 is such that drum 15 travels the angular distance between record head 14 and read head 18 in 360° of rotation of the antenna. The video output of head 18 is amplified and rectified by elements 19 and 20 to produce a negative gain control voltage across R-C network 21. This voltage is applied to the radio frequency stages of receiver 5 to control their gain. In this manner the gain of the receiver during each 360° scan is made to vary in accordance with the magnitude and azimuth of the jamming signal experienced during the preceding scan.

I claim:
1. In combination with a radar system having a scanning antenna fed with periodic pulses of high frequency energy and a receiver for receiving reflections of said pulses through the same antenna, a second receiver also coupled to receive signals through said antenna, a clutter gate coupled to the output of said second receiver for passing only those signals having a duration exceeding the duration of said pulses, means synchronized with said scanning antenna and receiving the output of said clutter gate for recording along a time base equal to the scanning cycle period the magnitude of the output of said clutter gate during each scanning cycle, and means operative during the next scanning cycle for reading said record and for controlling the gain of the first mentioned receiver in inverse relationship to the magnitude of said recorded clutter gate output.

2. In combination with a radar system having a directional scanning antenna fed with periodic short duration pulses of high frequency energy and a receiver for receiving reflections of said pulses through the same antenna, anti-jamming apparatus comprising: signal blocking means coupled to said antenna and operative to pass only those received signals having a duration greater than the duration of said pulses, recording means synchronized with the scanning operation of said antenna and operative during each scanning cycle to record the signals passed by said signal blocking means as a function of antenna direction, and means coupled to said recording means and to said receiver and operative during the next succeeding scanning cycle to adjust the gain of said receiver as a function of the recorded information.

References Cited in the file of this patent
UNITED STATES PATENTS
2,422,334    Bedford _____ June 17, 1947